United States Patent
Speckmann et al.

(10) Patent No.: US 8,242,774 B2
(45) Date of Patent: *Aug. 14, 2012

(54) INCREMENTAL DISPLACEMENT TRANSDUCER AND METHOD FOR DETERMINING A DISPLACEMENT OF A FIRST OBJECT RELATIVE TO A SECOND OBJECT

(75) Inventors: Christian Speckmann, Bensheim (DE); Timo Galm, Mannheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 182 days.

This patent is subject to a terminal disclaimer.

(21) Appl. No.: 12/338,409

(22) Filed: Dec. 18, 2008

(65) Prior Publication Data
US 2009/0160434 A1    Jun. 25, 2009

(30) Foreign Application Priority Data
Dec. 21, 2007  (DE) .......................... 10 2007 061 967

(51) Int. Cl.
*G01B 7/14*    (2006.01)
(52) U.S. Cl. .............................. 324/207.24; 324/207.15
(58) Field of Classification Search ............. 324/207.15, 324/24
See application file for complete search history.

(56) References Cited

U.S. PATENT DOCUMENTS

| | | | |
|---|---|---|---|
| 4,893,078 A | 1/1990 | Auchterlonie | |
| 5,003,260 A | 3/1991 | Auchterlonie | |
| 5,412,317 A * | 5/1995 | Kyoizumi | 324/207.14 |
| 5,905,215 A * | 5/1999 | Jin et al. | 73/865.9 |
| 5,955,882 A * | 9/1999 | Eisschiel et al. | 324/207.21 |
| 6,509,732 B1 * | 1/2003 | Rhodes et al. | 324/207.12 |
| 6,611,138 B2 * | 8/2003 | Vasiloiu | 324/207.12 |
| 7,245,121 B2 * | 7/2007 | Freund et al. | 324/207.16 |
| 7,253,611 B2 * | 8/2007 | Ma et al. | 324/207.2 |
| 7,394,244 B2 * | 7/2008 | Schley et al. | 324/207.24 |
| 7,535,216 B2 * | 5/2009 | Speckmann et al. | 324/207.15 |

FOREIGN PATENT DOCUMENTS

| | | |
|---|---|---|
| DE | 31 00 486 A1 | 2/1982 |
| DE | 39 26 328 A1 * | 2/1991 |
| DE | 197 01 319 A1 * | 7/1998 |
| DE | 19701319 A1 | 7/1998 |
| EP | 1 071 927 A1 | 1/2001 |

OTHER PUBLICATIONS

Robert E. Simpson, Introductory Electronics for Scientists and Engineers, 1974, Allyn and Bacon, Second Edition, pp. 344-345.*

* cited by examiner

*Primary Examiner* — Jay Patidar
(74) *Attorney, Agent, or Firm* — John A. Merecki; Hoffman Warnick LLC

(57) ABSTRACT

An incremental displacement transducer and method for determining a displacement of a first object relative to a second object having a scanning unit linked or to be linked with the first object for scanning a spacing or division track linked or to be linked with the second object having first areas and second areas arranged in alternating manner with a period length, the first areas having a first physical property and the second areas a second physical property differing therefrom, and where the scanning unit has a plurality of sensors for scanning the first areas and the second areas on the basis of the first and/or second physical property, and having an evaluation unit linked with the scanning unit for determining the displacement on the basis of measuring signals of the sensors.

16 Claims, 2 Drawing Sheets

INCREMENTAL DISPLACEMENT TRANSDUCER AND METHOD FOR DETERMINING A DISPLACEMENT OF A FIRST OBJECT RELATIVE TO A SECOND OBJECT

In a first aspect, the present invention relates to a incremental displacement transducer.

In a further aspect, the invention relates to a method for determining a displacement or movement of a first object relative to a second object.

BACKGROUND OF THE INVENTION

Such an incremental displacement transducer is e.g. known from DE 197 01 319 A1 and has a scanning unit linked or to be linked with the first object for scanning a division or spacing track linked or to be linked with the second object having first areas and second areas, which are arranged in period length-alternating manner. The first areas have a first physical property and the second areas a second physical property differing therefrom. The scanning unit also has a plurality of sensors for scanning the first and second areas on the basis of the first and/or second physical property. Finally, there is an evaluation unit linked with the scanning unit for determining the displacement on the basis of measuring signals of the sensors.

With such a method, also known from DE 197 01 319 A1, a spacing track linked with the first object is scanned with a plurality of sensors linked with the second object. The spacing track has first areas with a first physical property and second areas with a second physical property, which are arranged in period length-alternating manner and from the measuring signals of the sensors obtained as a result of the first and/or second physical property, the displacement of the first object relative to the second object is determined.

Inductive incremental displacement transducers are also described in DE 31 00 486 A1, EP 1 071 927 B1, U.S. Pat. No. 4,893,078 and U.S. Pat. No. 5,003,260.

Incremental displacement transducers are used for measuring position changes. Two mutually spaced sensors in each case determine the position of one spacing track. By counting the single pulses the movement of the spacing track relative to the sensors can be determined. As the signals generated by the two sensors have a phase shift of e.g. 90°, a direction identification is also possible.

If inductive sensors are used in the case of the incremental displacement transducer, difficulties arise due to the dependence of the switching point of the sensors on laterally approaching a metal object, e.g. a conductive area of the spacing track, on the distance of the sensor from said spacing track. The closer the conductive area of the spacing track is to the sensor, the earlier it is identified.

Thus, the 1:1 pulse pause ratio desired for direction identification can only be obtained for a very specific spacing or distance.

Moreover, in the prior art spacing tracks are always necessary, where the first and second areas always have the same extension. Thus, spacing tracks in most cases must be separately applied to the objects to be monitored, even if there are already repetitive structures, which would fundamentally be suitable for identifying a shift.

The object of the invention is to provide an incremental displacement transducer and a method for determining the displacement of a first object relative to a second object where, substantially independently of the specific distance from the sensors used to a spacing or division track and substantially independently of the specific spacing track used, reliable measurement results are provided.

Advantageous further developments of the inventive incremental displacement transducer form the subject matter of the dependent claims and are also described in the following description, particularly in conjunction with the drawings.

BRIEF SUMMARY OF THE INVENTION

The incremental displacement transducer of the aforementioned type is inventively further developed in that the scanning unit has at least four sensors, which are spaced from one another over at least one period length of the spacing track, that at least one first switching signal can be generated from the measuring signals of the sensors in the evaluation unit for determining the displacement, that the first switching signal assumes a first value, particularly HIGH, if the measuring signal of a first selected sensor of a first subgroup of sensors assumes a maximum value within the first subgroup and simultaneously the measuring signal of a second selected sensor of a second subgroup of sensors assumes a maximum value within the second subgroup and/or that the first switching signal assumes a first value, particularly HIGH, if the measuring signal of a third selected sensor of a third subgroup of sensors assumes a maximum value within the third subgroup and simultaneously the measuring signal of a fourth selected of a fourth subgroup of sensors assumes a maximum value within the fourth subgroup, and that the first switching signal otherwise assumes a second value, particularly LOW, each subgroup comprising at least two sensors.

The method of the aforementioned type is inventively further developed in that at least four sensors are arranged in mutually spaced manner along the spacing track over at least one period length of said spacing track, that the displacement is determined on the basis of at least one first switching signal, that the first switching signal assumes a first value, particularly HIGH, if the measuring signal of a first selected sensor of a first subgroup of sensors assumes a maximum value within the first subgroup and simultaneously the measuring signal of a second selected sensor of a second subgroup of sensors assumes a maximum value within the second subgroup and/or that the first switching signal assumes a first value, particularly HIGH, if the measuring signal of a third selected sensor of a third subgroup of sensors assumes a maximum value within the third subgroup and simultaneously the measuring signal of a fourth selected sensor of a fourth subgroup of sensors assumes a maximum value within the fourth subgroup, and that the first switching signal otherwise assumes a second value, particularly LOW, each subgroup comprising at least two sensors.

The incremental displacement transducer according to the invention is in particular suitable for performing the method according to the invention. The method according to the invention can particularly be carried out using the incremental displacement transducer according to the invention.

The essential concept of the invention is to eliminate the spacing dependence of the sensor signals through a logical evaluation, where it is no longer a matter of the absolute level of the measuring signals, but instead the relative level of a measuring signal of a selected sensor compared with the measuring signals of sensors forming a subgroup.

The second essential concept of the invention and linked therewith, is to provide at least four sensors over a period of the spacing track and to carry out a subdivision of said sensors into subgroups, each subgroup comprising at least two sensors.

A first vital advantage of the inventive solution is the spacing independence of the evaluation. This permits especially universal uses within the industrial sector, because it is not necessary to precisely set up the measuring device relative to the division or spacing track.

A second important advantage is that the spacing track, as a fundamental difference compared with known solutions, need not have a 1:1 spacing or division. Fundamentally any random periodic structure can be used for generating the incremental signal.

The maximum measuring signal is here understood to mean the signal occurring with a maximum approach of the corresponding first or second area to the sensor in question and which is supplied by this sensor. Relative to 0, the amount can optionally be a minimum value. The latter is e.g. the case if the movement of a metal sheet is determined with an inductive sensor, said metal sheet having holes with periodic, but comparatively large spacings. If a sensor is positioned directly in front of the hole, damping decreases to a minimum value, but which, based on the full damping, is a maximum value, namely a maximum variation value.

A further essential point for the invention is that the signals of two adjacent sensors overlap within the desired detection range of the rail. This means that the lateral spacing of two adjacent sensors relative to the lateral extension of the smaller of the two areas of the spacing track is selected in such a way that at least temporarily both sensors supply a detection signal based on this area.

Thus, the web width of a lug of a spacing track must have a certain minimum width, so that at least temporarily two adjacent sensors supply a signal on the basis of said lug. This condition can consequently be fulfilled on the one hand by a certain minimum width of the first and/or second area and on the other by a certain lateral maximum spacing of the sensors.

As long as the above condition relative to the spacing of the sensors is fulfilled, the sensors could fundamentally be randomly distributed over a period of the spacing track or also over several periods. In principle, there can also be a variable mutual spacing of the sensors, but in preferred variants the sensors are uniformly spaced, because then evaluation is easiest.

Due to the periodicity of the spacing track, the sensor positions differing by an integral multiple of the period length are equivalent. One or more sensors could therefore be placed on the spacing track displaced by an integral multiple of the period length. This can e.g. be appropriate with constricted space conditions. The sensors of the scanning unit can also be positioned far apart.

The target width, e.g. the width or lateral extension of the first area, can also be wider than the gap width, i.e. a lateral extension of the second area. Then, optionally in place of the maximum signal, as explained hereinbefore, the signal minimum can be used as the criterion.

The switching signals can also be outputted in inverted manner, i.e. in place of the value HIGH the value LOW is outputted and vice versa.

In principle, any random physical property which can be determined using sensors can serve to form the spacing track. For example, the first and second areas can have different magnetic, optical or also mechanical properties.

Inventive variants offer particularly numerous use possibilities and are particularly reliable with regards to operation in industrial environments, where the first areas are electrically conductive and the second areas electrically insulating and the sensors are inductive sensors.

In principle, any subgroup can be formed by a random number of sensors. However, evaluation is easier if each subgroup comprises precisely two sensors. The determination of the extreme value is then reduced to a comparison of the measuring signals of two sensors.

In order that all the generated measurement information is effectively utilized, it is advantageous if each sensor belongs to at least one subgroup.

In a preferred variant of the inventive incremental displacement transducer, the scanning unit has four sensors and the first subgroup is formed by the first and third sensors and the second subgroup by the second and fourth sensors. Thus, on the sensor side there is a minimum of components. Preferably the sensors are arranged with a spacing of ¼ of the division or spacing period.

However, in principle it is also possible to sample periodic structures with a larger spacing ratio or duty cycle or division ratio. The scanning unit can e.g. have eight sensors and the first subgroup can be formed by the seventh and second sensors, the second subgroup by the eighth and fifth sensors, the third subgroup by the fourth and first sensors and the fourth subgroup by the sixth and third sensors. With such an evaluation logic, independently of a division ratio of the division track a switching signal with the duty factor 1:1 can be generated. More particularly in this variant the sensors forming a subgroup are in each case separated by two further sensors and this will be explained in greater detail hereinafter.

The numerical designation of the sensors is here understood to mean that e.g. in the case of sensors arranged in a row the far left sensor is the first and then the right following sensor the second and so on with respect to the third, fourth, fifth, sixth, seventh and finally the far right sensor is called the eighth sensor.

In general, on the basis of the above explanations, the greater the division ratio of the periodic structure, the more sensors are required.

The division track can fundamentally comprise a random periodic structure, which has appropriate physical properties with respect to scanning. Thus, e.g. on a moving device or a device which is to be monitored, an existing hole lattice can serve as the division or spacing track.

The choice of sensors for the subgroups and the particular choice of one sensor from such a subgroup for forming the first switching signal can, provided that the condition that the subgroups in each case have at least two sensors is fulfilled, take place in a random manner.

In order to obtain directional information from the measured values taken, the evaluation unit is preferably set up for generating a second switching signal, which has a phase shift relative to the first switching signal. The phase shift must not be 0 or 180°, because in these cases there is no additional information. With particular preference the second switching signal has a phase shift of 90°.

Advantageously the evaluation logic is selected in such a way that the duty cycle of the first switching signal and optionally also of the second switching signal is 1:1. Use can then be made of known evaluation algorithms.

In practise it has been found that it is difficult to compare measuring signals of immediately adjacent sensors, because these measuring signals frequently greatly overlap. E.g. if the measuring signal of a first sensor assumes a maximum, then the measuring signal of an adjacent sensor has not yet sufficiently decayed to allow a valid differentiation. Thus, preferably the subgroups are chosen in such a way that between the sensors forming a subgroup there is at least one further sensor not belonging to the subgroup. If e.g. between the sensors forming a group there is precisely one further sensor, this means that in each case only the second highest measuring signals are evaluated. As the gradients of the second highest signals or, expressed in other terms the gradients of the detection curves of two sensors separated by a further sensor at the intersection are already significantly higher than in the vicinity of the intersections of the detection curves of immediately adjacent sensors, this enables much better defined switching points to be obtained.

As a function of a density of the sensor arrangement and the overlapping characteristic of the respective detection curves, which is in turn dependent on the spacing track, it is possible to adjust how far apart the sensors forming a subgroup are positioned, i.e. how many sensors are located between in each case two sensors. It can e.g. be preferred that between the sensors forming a subgroup there are precisely two further sensors in each case. This means that in each case the measurement curves undergo evaluation in the vicinity of the intersections of sensors which are separated by two further sensors. The sensor arrangement should be imagined as periodically continued for determining how many sensors are located between two sensors of a group. Thus, conceptually a further sensor 1 should follow a sensor 8, so that in this example sensors 8 and 1 are looked upon as immediately adjacent. Therefore sensor 7 is separated from sensor 2 by sensor 8 and sensor 1 is consequently separated by two sensors.

In another evaluation variant, the switching conditions for the first and second subgroups on the one hand are interconnected with the switching condition for the third and fourth subgroups on the other by a logic AND link. The first switching signal consequently assumes a first value, particularly HIGH, if the following conditions are fulfilled simultaneously: the measuring signal of the first selected sensor assumes a maximum value within the first subgroup, the measuring signal of the second selected sensor assumes a maximum value within the second subgroup, the measuring signal of the third selected sensor assumes a maximum value within the third subgroup and the measuring signal of the fourth selected sensor assumes a maximum value within the fourth subgroup. Otherwise the first switching signal assumes a second value, particularly LOW.

Further advantages and features of the invention are explained in greater detail hereinafter relative to the attached diagrammatic drawings, wherein show:

DETAILED DESCRIPTION OF THE INVENTION

Figure 1:
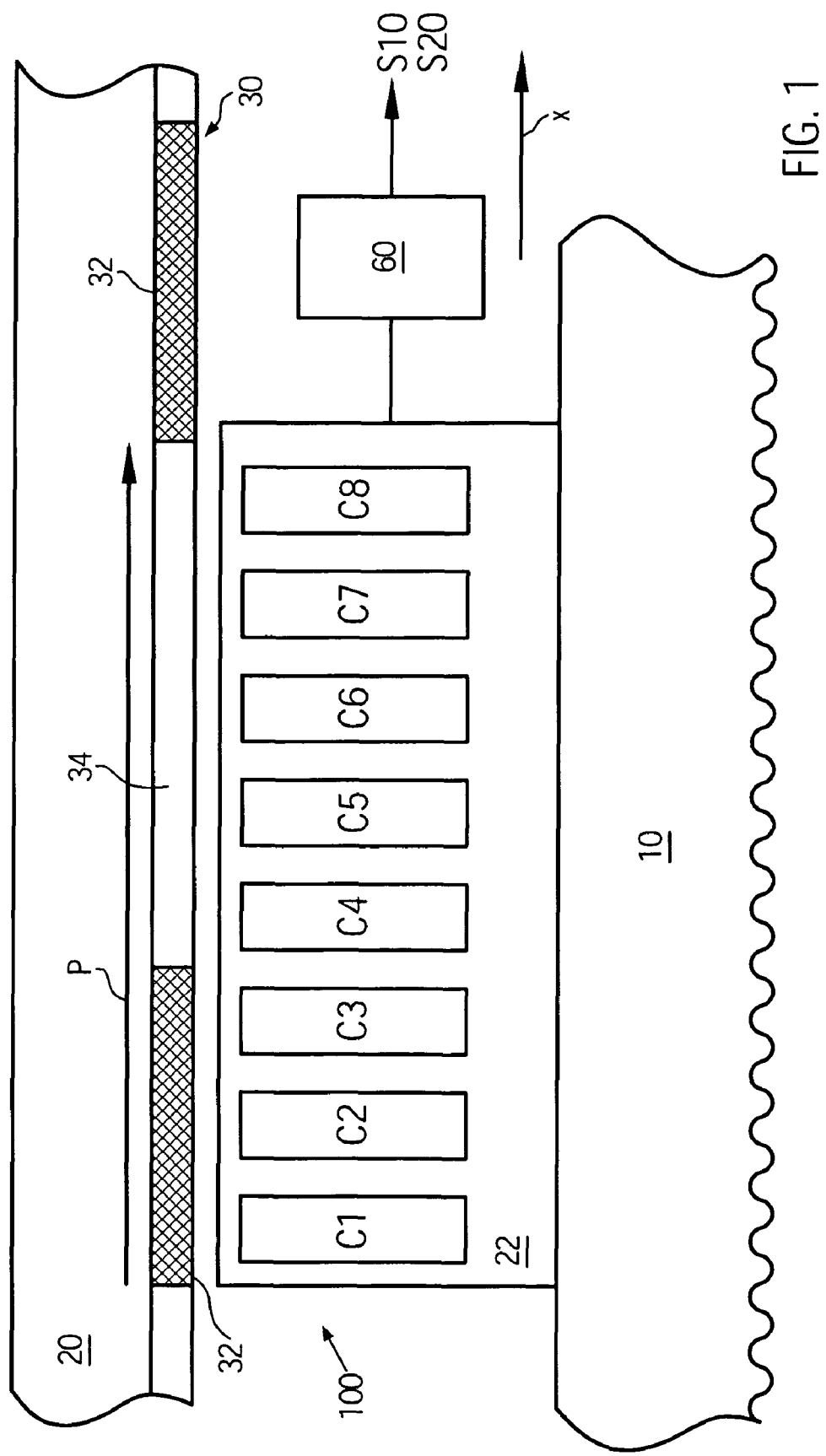
FIG. 1 A first embodiment of the inventive incremental displacement-transducer with eight sensors.

An embodiment of the inventive incremental displacement transducer is explained relative to FIG. 1.

The incremental displacement transducer 100 shown therein has as its essential components a scanning unit 22 located at a first object 10 and provided with a plurality of sensors C1, ..., C8, which is connected to an evaluating unit 60.

The sensors C1, ..., C8 of scanning unit 22 are used for scanning a spacing or division track 30, which is linked with a second object 20 or optionally itself forms the second object. The spacing track 30 essentially comprises first areas 32 and second areas 34 arranged in alternating manner with a period p. They in each case have different physical properties, which permits the scanning with the aid of sensors C1, ..., C8. In the example shown, the first areas 32 are electrically conductive, metal lugs and correspondingly the second areas 34 are holes or recesses, e.g. in a metal sheet. The sensors C1, ..., C8 are inductive sensors, e.g. inductive proximity switches.

Figure 2:
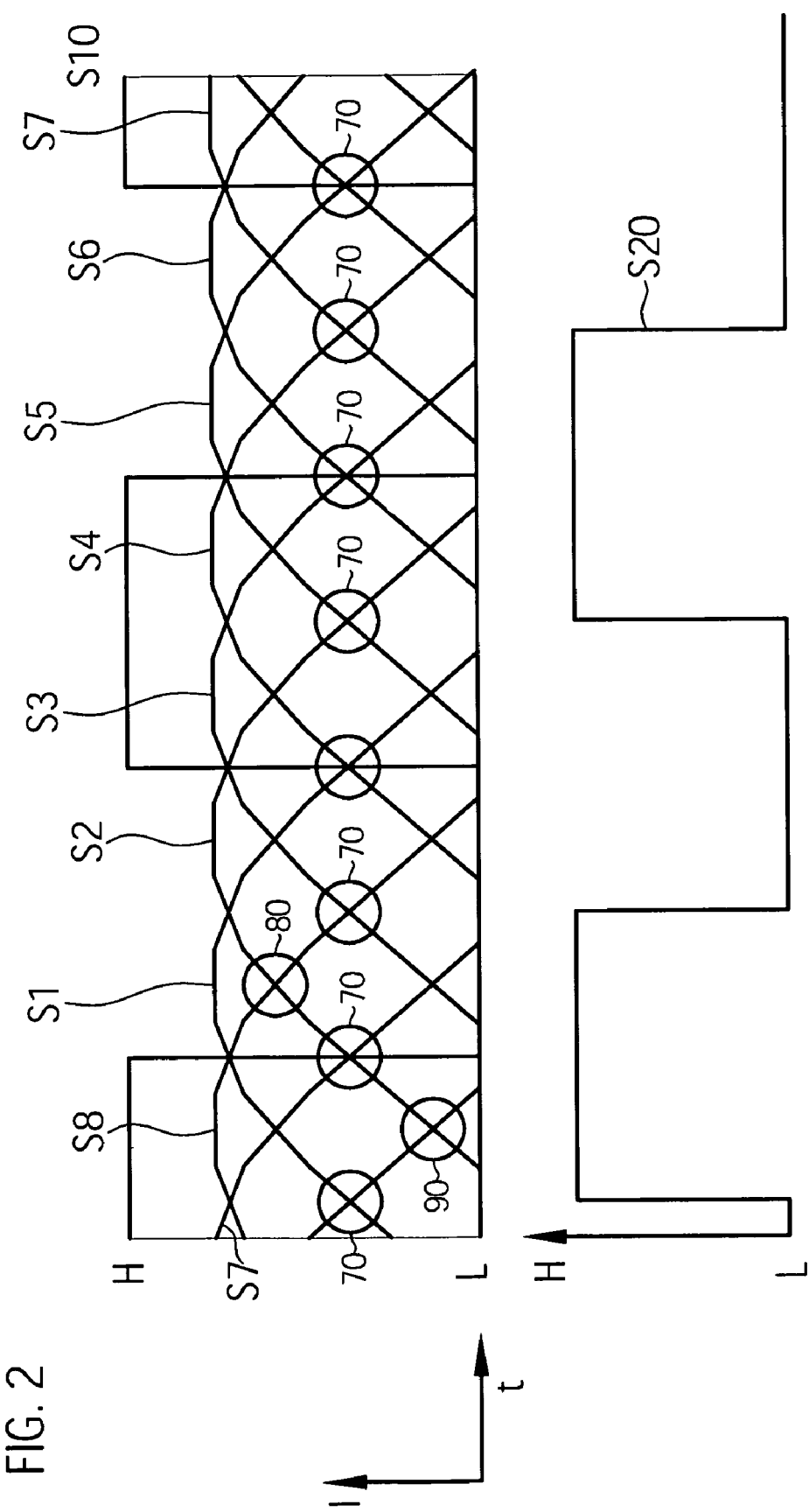
FIG. 2 A diagrammatic representation of the measuring signals of the eight sensors of the embodiment shown in FIG. 1.

In the case of a lateral movement of the first object 10 relative to the second object in a direction illustrated by arrow x, there are temporal variations of the measuring signals S1, ..., S8 and the switching signals S10, S20 derived therefrom in evaluation unit 60 and their temporal variations are diagrammatically illustrated in FIG. 2.

The first switching signal S10 is generated with the following evaluation condition:
S10=HIGH, if
S7>S2 and simultaneously S8>S5
or S4>S1 and simultaneously S3>S6,
otherwise S10 is LOW.

Although the spacing track 30 does not have a spacing or division ratio 1:1, it is still possible to generate a first switching signal S10 with a duty cycle 1:1, which is favourable with regards to the further evaluation.

Correspondingly with the following condition the second switching signal S20 can be generated and this is shown in FIG. 2 below the path of the first signal S10. With respect to the first switching signal S10, the second switching signal S20 is phase shifted by 90°, which is also favourable for further evaluation purposes.

The second switching signal S20 is HIGH if
S8>S3 and simultaneously S1>S6
or S5>S2 and simultaneously S4>S7,
otherwise S20 is LOW.

It is important in this embodiment that the subgroups, i.e. here the sensor pairs (C7; C2), (C8; C5), (C4; C1) and (C3; C6) for the first switching signal and the sensor pairs (C8; C3), (C1; C6), (C5; C2) and (C4; C7) for the second switching signal S20 are selected in such a way that in each case there are precisely two sensors between the sensors forming a subgroup. For this purpose the sensor arrangement should be imagined as periodically continued, so that a further sensor C1 follows onto the sensor C8 on the right-hand side.

Technically this selection of subgroups leads e.g. to the measuring signal of a sensor in the vicinity of the intersection being evaluated with the measuring signal of the sensor following the next but one sensor. These areas are marked with circles 70 in FIG. 2.

The gradients of the measuring signals S1, ..., S8 are particularly great in the areas 70, so that the switching points can correspondingly be particularly precisely determined.

The intersections of the measuring signals in the areas marked by circles 70, 80, 90 can also be used for generating the switching signal through suitable logic conditions. In this way, the switching signals can be very specifically generated for the set problem. It is e.g. possible with the above-described arrangement to provide output pulses, whose time width is at a minimum a quarter of the pulse width of the switching signal S10 or S20. If use was e.g. made of all the intersections in areas 70, 80, 90, a switching signal with a four times higher frequency than S10 and S20 would be generated.

The present invention provides a novel incremental displacement transducer and a method for determining a displacement of a first object relative to a second object. An essential feature of the invention is a logic interconnection of the measuring signals of the individual sensors in order to generate one or more switching signals. Numerous combinations are possible, so that overall the switching signals can be set in a very specific manner. It is e.g. possible to generate switching signals, whose periodicity is a multiple of the original periodicity of the spacing track. In particular, different duty cycles can be obtained and the output pulses can be narrower than a target width.

The invention claimed is:

1. Incremental displacement transducer for determining a displacement of a first object relative to a second object,
   having a scanning unit linked or to be linked with the first object for scanning a spacing track linked or to be linked with the second object and having first areas and second areas arranged in alternating manner with a period length,
   the first areas having a first physical property and the second areas a second physical property differing therefrom and
   the scanning unit has a plurality of sensors for scanning the first areas and the second areas on the basis of at least one of the first and the second physical property, each sensor yielding a separate measuring signal, each measuring signal being measured separately, and
   having an evaluation unit linked with the scanning unit for determining the displacement on the basis of the measuring signals of the sensors,
   wherein
   the scanning unit has eight sensors, which are spaced from one another over at least one period length of the spacing track in such a way that the measuring signals of adjacent sensors and of sensors spaced by another sensor overlap,
   at least one first switching signal is generated from the eight separate measuring signals of the sensors in the evaluation unit for the determination of the displacement,
   the first switching signal assumes a first value if the measuring signal of a first selected sensor of a first subgroup of sensors assumes a maximum value within the first subgroup and simultaneously the measuring signal of a second selected sensor of a second subgroup of sensors assumes a maximum value within the second subgroup, and
   the first switching signal otherwise assumes a second value,
   each subgroup comprising at least two sensors, and
   wherein there is at least one further sensor between the sensors forming a subgroup.

2. Incremental displacement transducer according to claim 1, wherein
   the first switching signal assumes the first value if the measuring signal of a third selected sensor of a third subgroup of sensors assumes a maximum value within the third subgroup and simultaneously the measuring signal of a fourth selected sensor of a fourth subgroup of sensors assumes a maximum value within the fourth subgroup, and the first switching signal otherwise assumes the second value,
   each subgroup comprising at least two sensors.

3. Incremental displacement transducer according to claim 1, wherein
   the first value is HIGH and the second value is LOW.

4. Incremental displacement transducer according to claim 1, wherein
   the sensors are arranged in uniformly spaced manner.

5. Incremental displacement transducer according to claim 1, wherein
   the first areas are electrically conductive and the second areas electrically insulating and
   the sensors are inductive sensors.

6. Incremental displacement transducer according to claim 1, wherein
   each sensor belongs to at least one subgroup.

7. Incremental displacement transducer according to claim 1, wherein
   each subgroup comprises precisely two sensors.

8. Incremental displacement transducer according to claim 1, wherein
   there are two further sensors between the sensors forming a subgroup.

9. Incremental displacement transducer according to claim 1, wherein
   the first subgroup is formed by the seventh and second sensors,
   the second subgroup is formed by the eighth and fifth sensors,
   the third subgroup is formed by the fourth and first sensors and
   the fourth subgroup is formed by the sixth and third sensors.

10. Incremental displacement transducer according to claim 1, wherein
    the evaluation unit is set up for generating a second switching signal, which has a phase shift relative to the first switching signal.

11. Incremental displacement transducer according to claim 1, wherein
    the duty cycle of the first switching signal is 1:1.

12. Incremental displacement transducer according to claim 1, wherein
    the spacing track is formed by a hole lattice.

13. Method for determining a displacement of a first object relative to a second object, where a spacing track linked with the first object is scanned by a plurality of sensors linked with the second object,
    the spacing track having first areas with a first physical property and second areas with a second physical property, arranged in alternating manner with a period length and where the displacement of the first object relative to the second object is determined from measuring signals of the sensors obtained on the basis of at least one of the first and the second physical property, each sensor yielding a separate measuring signal, each measuring signal being measured separately,
    wherein eight sensors are arranged in mutually spaced manner along the spacing track over at least one period length of said spacing track in such a way that the measuring signals of adjacent sensors and of sensors spaced by another sensor overlap,
    the displacement is determined on the basis of at least one first switching signal, which is generated from the eight separate measuring signals,
    the first switching signal assumes a first value if the measuring signal of a first selected sensor of a first subgroup of sensors assumes a maximum value within the first subgroup and simultaneously the measuring signal of a second selected sensor of a second subgroup of sensors assumes a maximum value within the second subgroup and
    the first switching signal otherwise assumes a second value,
    each subgroup comprising at least two sensors,
    wherein there is at least one further sensor between the sensors forming a subgroup.

14. Method according to claim 13, wherein the first switching signal assumes the first value if the measuring signal of a third selected sensor of a third subgroup of sensors assumes a maximum value within the third subgroup and simultaneously the measuring signal of a fourth selected sensor of a fourth subgroup of sensors assumes a maximum value within the fourth subgroup, the first switching signal otherwise assumes the second value, each subgroup comprising at least two sensors.

15. Method according to claim 14, wherein
the first switching signal assumes the first value if the following conditions are fulfilled simultaneously:
the measuring signal of the first selected sensor assumes a maximum value within the first subgroup,
the measuring signal of the second selected sensor assumes a maximum value within the second subgroup,
the measuring signal of the third selected sensor assumes a maximum value within the third subgroup and
the measuring signal of the fourth selected sensor assumes a maximum value within the fourth subgroup and
the first switching signal otherwise assumes the second value.

16. Method according to claim 13, wherein
the first value is HIGH and the second value is LOW.

* * * * *